Sept. 7, 1965  F. MASSA  3,205,476
ELECTROACOUSTIC TRANSDUCER
Filed Nov. 8, 1960  2 Sheets-Sheet 1
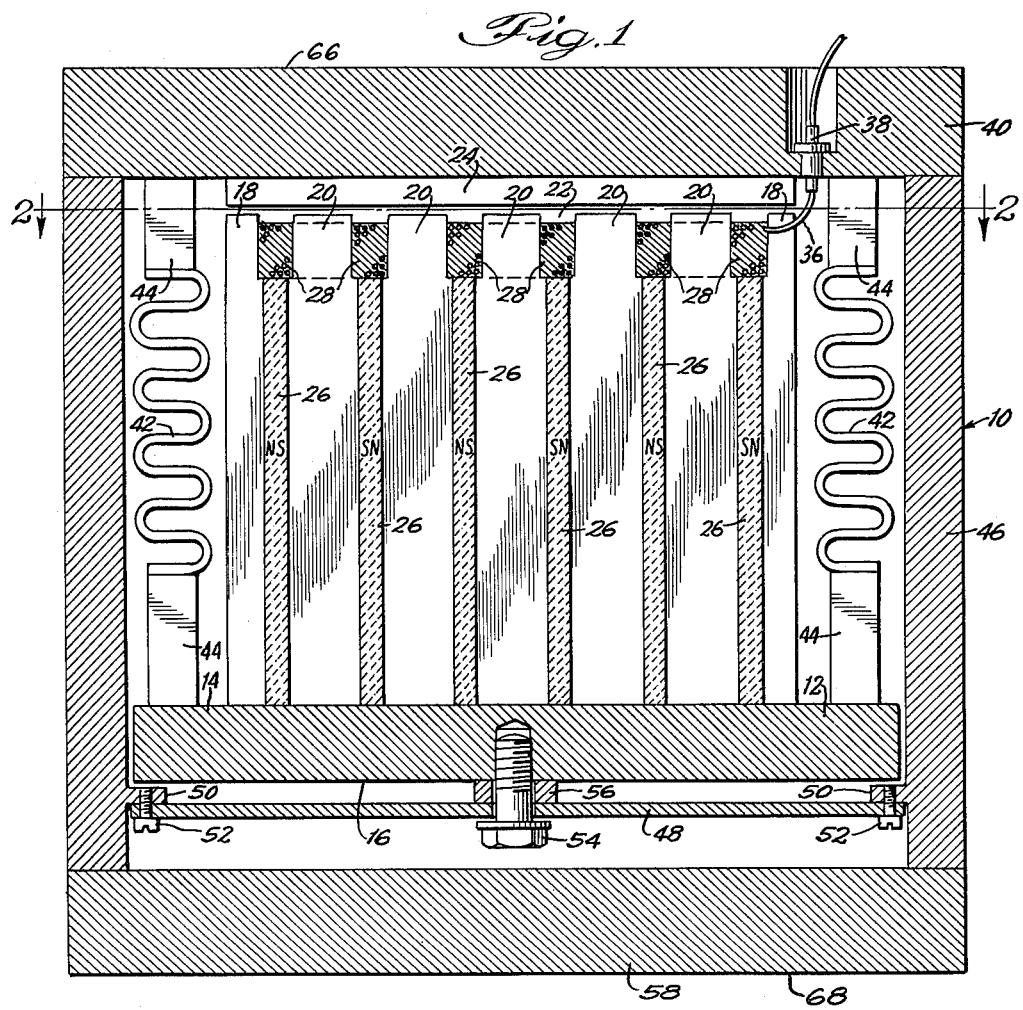
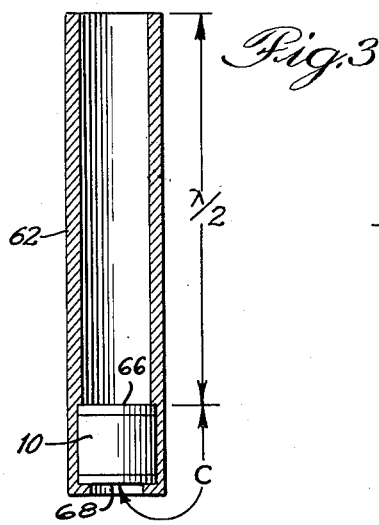
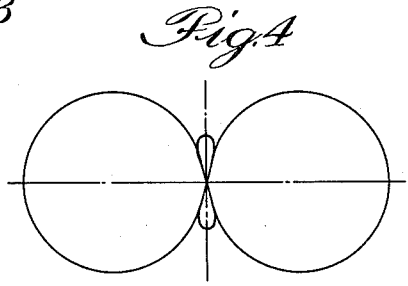
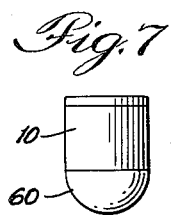
INVENTOR:
Frank Massa,
BY Louis Bernat
ATTORNEY.

Sept. 7, 1965    F. MASSA    3,205,476
ELECTROACOUSTIC TRANSDUCER
Filed Nov. 8, 1960    2 Sheets-Sheet 2

INVENTOR:
Frank Massa,
BY
ATTORNEY.

United States Patent Office 3,205,476
Patented Sept. 7, 1965

3,205,476
ELECTROACOUSTIC TRANSDUCER
Frank Massa, Cohasset, Mass., assignor, by mesne assignments, to Dynamics Corporation of America, New York, N.Y., a corporation of New York
Filed Nov. 8, 1960, Ser. No. 68,054
8 Claims. (Cl. 340—8)

This application is a continuation-in-part of my copending application, Serial No. 34,731, filed June 8, 1960.

This invention relates generally to electroacoustic transducers and more particularly to new and improved electroacoustic sonar transducers adapted for efficient use in deep water at high power outputs.

It is a primary object of this invention to further improve the efficiency of operation of a low-frequency sonar transducer which is capable of generating acoustic power levels of several hundred to several thousand watts and of operating at submerged depths of several hundred to several thousand feet of water.

Another object of this invention is to eliminate many of the critical tolerances which are required in prior deep water, high power, sonar transducer structures.

A still further object of this invention is to improve the efficiency of operation of such a sonar transducer whereby the external vibrating mass of the transducer is reduced to a minimal value relative to the internal suspended mass of the transducer.

Another object of this invention is to eliminate the need for D.C. polarizing current in the transducer magnetic circuit whereby the electrical magnetizing power is eliminated, which results in a simplified transducer which may be operated directly from an A.C. power source.

A further object of this invention is to provide a rigid hermetically-sealed housing structure for a relatively high power sonar transducer which will withstand hydrostatic pressures equivalent to submerged depths in excess of 1000 feet of water.

Another object of this invention is provide a new and improved transducer utilizing an air gap construction such that any deflection of the housing structure which may result due to high hydrostatic pressures will not change the air gap dimensions, thereby enabling the electromagnetic characteristics of the transducer to be maintained independent of the hydrostatic pressure under which the transducer operates.

A still further object of this invention is to provide an improved underwater transducer capable of highly efficient operation in the lower or mid-audio frequency range.

The above and other objects of this invention are set forth with particularity in the appended claims. However, for a better understanding of the invention itself, together with further features and advantages thereof, reference is made to the accompanying description and drawings in which is shown an illustrative embodiment of the invention.

FIGURE 1 is an elevational view, partly in cross-section, of one illustrative embodiment of the new transducer construction;

FIGURE 3 shows an assembly view, partly in cross section of the novel transducer arrangement in a tubular baffle structure;

Figure 5:
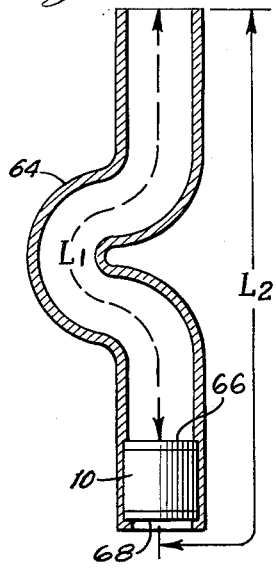
Figure 6:
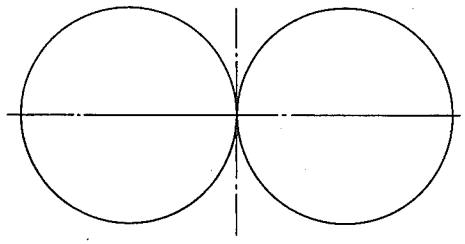

FIGURE 4 illustrates the directional radiation pattern resulting from the baffle structure of FIGURE 3 when the transducer dimensions are not negligible compared to the one half dimension of the sound at the frequency of operation and having primary lobes of radiation transverse to the longitudinal axis of the baffle structure and secondary lobes of radiation along the longitudinal axis of the baffle structure;

FIGURE 5 illustrates an alternative tubular baffle, partly in cross-section, which corrects for the transducer dimensions;

FIGURE 6 shows the radiation pattern resulting from the illustrative baffle structure shown in FIGURE 5 and having lobes of radiation transverse to the longitudinal axis of the transducer within the baffle structure; and FIGURE 7 illustrates one illustrative transducer construction embodying the invention and having a thin wall hemispherical shell forming one end plate.

Figure 2:
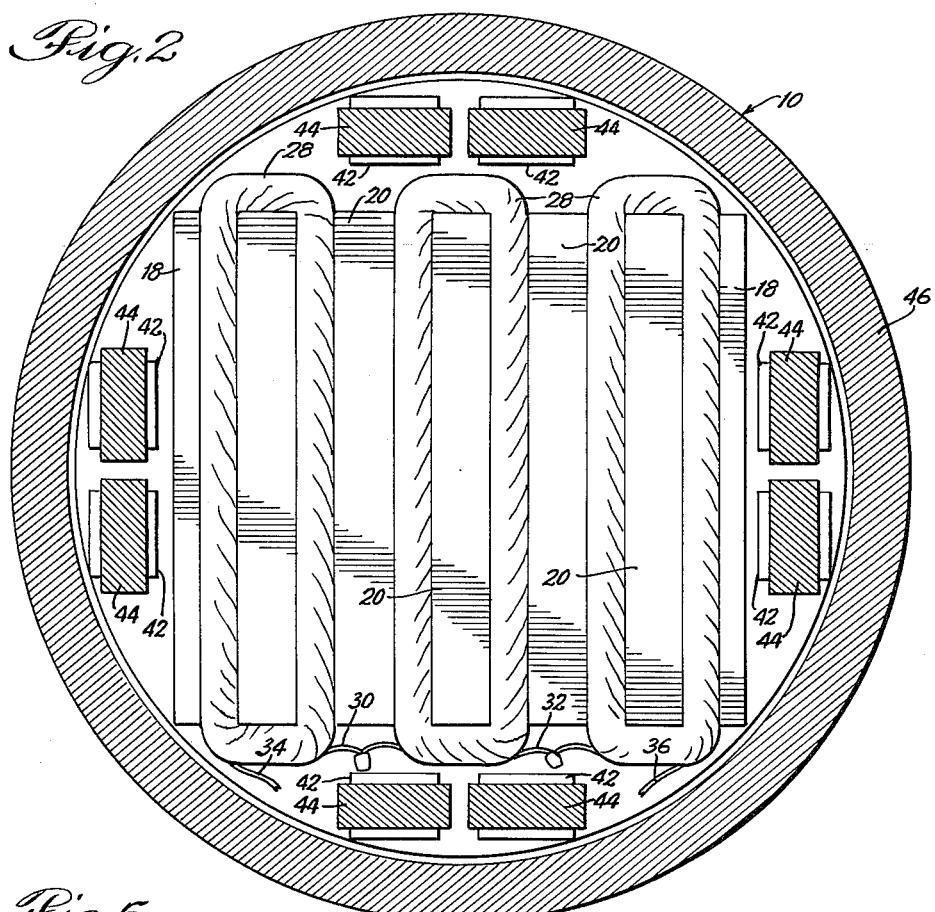
FIGURE 2 is a plan view, partially in cross section, taken substantially as shown along the line 2—2 of FIGURE 1.

Referring now to the drawing, and more particularly to FIGURES 1 and 2, the reference numeral 10 identifies one illustrative embodiment of a novel transducer construction in accordance with the invention which comprises a center plate 12 having top and bottom surfaces 14 and 16 respectively which advantageously are flat and parallel to each other. Several stacks of bonded magnetic laminations 18 and 20 are attached, as by means of a high tensile strength cement such as an epoxy type resin, to the flat surface 14 of the center plate 12, as illustrated. In one preferable embodiment, lamination stack 18 is made equivalent to one-half of lamination stack 20 in order to provide magnetic symmetry in the air gap 22 between the lamination stacks and the magnetic armature 24 spaced therefrom.

Before assembling the lamination stacks 18 and 20 to the plate 12, the stacks preferably first are bonded to permanent magnets 26, as illustrated in FIGURE 1. It has been found that maximum operating efficiency may be realized by employing a ceramic type permanent magnet such as, for example, the material sold by the Indiana Products Company under the trade name of "Indox V." This type of permanent magnet material will permit the passage of an A.C. flux with minimum magnetic losses. Because the ceramic magnet 26 has virtually the same permeability as air, it has been found advantageous to employ a cross-sectional area of magnet several times higher than the corresponding cross-sectional area of the air gap 22 which the magnet is intended to polarize. It further has been found advantageous to employ a relatively large cross-sectional area of permanent magnet 26 to reduce the A.C. permeability of the magnet which, in turn, serves to minimize the effective series air gap which the magnet introduces by its presence in the magnetic circuit.

One highly satisfactory construction for a magnetic circuit in accordance with the invention is illustrated in FIGURE 1. In this preferable embodiment, the ceramic type permanent magnet assembly consists effectively of several E-shaped structures, each E having its own coil of wire 28 as well as a pair of polarizing magnets. For example, the magnetic assembly shown in FIGURE 1 can be considered effectively as consisting of three E-shaped stacks bonded together and operating together for supplying magnetic energy to the transducer air gap 22. For example, considering the magnetic assembly of FIGURE 1, and starting with the magnetic lamination stack 18 at the left portion of the transducer 10, it can be seen that a first E-shaped structure is comprised of the stack 18 and the two stacks 20 immediately to the right thereof. Since, as stated hereinabove, the lamination stack 18 is made equal to one-half of the lamination stack 20, the next E-shaped structure comprises the middle three stacks 20, while the third E-shaped structure comprises the stack 18 at the right portion of the transducer 10 together with the two stacks 20 immediately to the left thereof. Thus, three E-shaped lamination stacks are effectively bonded together in the transducer embodiment of FIGURE 1.

Within the slots formed by the magnetic lamination assembly illustrated in FIGURE 1 are placed the coils of wire 28. These coils 28 are connected electrically in series, as by the connecting wires 30 and 32 shown in FIGURE 2, such that their electromagnetic effects are additive when A.C. driving current is supplied through the power leads 34 and 36. Each coil of wire 28 is solidly secured within the lamination slots by means of an epoxy cast resin or any other suitable means. Electrical connection to the coils of wire 28 are made through the sealed insulated terminals 38 shown mounted through suitable openings in the transducer end plate 40.

Advantageously, a laminated magnetic armature 24 may be bonded to the inner surface of the end plate 40, as illustrated, to establish a fixed air gap 22 between the ends of the lamination stacks 18 and 20 and the exposed flat surface of armature 24.

In accordance with a further feature of this invention, a plurality of support springs 42 are provided to resiliently support the inner magnetic assembly on the end plate 40. Preferably, the springs 42 are dimensioned such that when the springs are secured to the parallel faces of plates 14 and 40 by means of epoxy cement, or any other suitable means, the desired air gap spacing is provided between the surfaces of lamination stacks 18 and 20 and the armature 24. The compliance of the springs 42 advantageously is such that its magnitude in combination with the mass of the transducer assembly will be at resonance at the desired frequency of operation of the transducer.

The actual technique of assembling the transducer components may follow any suitable and convenient sequence. The figures of the drawing are only illustrative in nature and are intended to show the fundamental principles of the invention. For example, in the actual construction of one transducer embodiment, in accordance with the invention, the springs 42 were secured to the surface of plates 14 and 40 by use of bolts or other supporting links 44 and epoxy cement. The height of the spring assemblies 42 were ground to the dimension required to produce the desired operating air gap 22 when the springs were assembled, as illustrated. After assembling the springs 42 between plates 14 and 40, the housing structure 46, which in one preferred embodiment was made cylindrical in shape, was bonded to the end plate 40.

In order to provide transverse rigidity to the flexibly-mounted magnetic portion of the transducer assembly, it is contemplated that a thin washer member 48 may securely be fastened by means of the screws 52 to projections 50 on the housing structure 46. The washer 48 is very compliant as compared with the stiffness of the spring members 42 and, therefore, does not influence the resonant frequency of the structure. The transverse stiffness of the washer 48 is high and serves to prevent transverse displacements of the internal magnetic structure when the washer is secured to plate 14 as by means of the threaded bolt 54. A spacer 56 of suitable dimensions advantageously is placed, as shown, to accommodate the dimensional requirements of the assembly. The end cap 58 then may be bonded to the open end of housing 46 to thus complete the transducer assembly of the present invention.

In the description of the present transducer invention, given hereinabove, the end plates 40 and 58 are shown as solid discs. Those skilled in the art will readily appreciate that it is possible, however, to employ end plates which are hollowed out with a honeycomb grid structure, such as those shown in my co-pending application Serial No. 34,731. Such a honeycomb construction will serve to lighten the vibrating mass of the transducer and preserve a high rigidity for each end face such that submergence of the transducer in water depths exceeding 1000 feet will not cause failure of the structure. For still further lightening of the outer portion of the vibrating structure, it is a feature of this invention that the plate 58 may be replaced by a hemispherical shell 60 which may be kept thin walled to resist the water pressure and thus improve even further the efficiency of the structure. Such a transducer construction with a hemispherical shell end plate 60 is illustratively shown in FIGURE 7 of the drawing.

In my previously filed co-pending application, Serial No. 34,731, a balanced pair of opposing air gaps were employed in the transducer assembly such that the D.C. static air gap pull was balanced. In this previously disclosed structure, however, it may be necessary to maintain extremely close tolerances throughout both sides of the internal magnetic assembly in order that each air gap is kept exactly equal during fabrication. In the construction of the present invention, disclosed herein, only one air gap is employed with the result that it is only necessary to be concerned with the dimensions of the spring assemblies 42 in order to provide the desired operating characteristics. The housing structure 46 can now employ relatively greater tolerances since the opposite end of the housing is not required to establish a second air gap. It can be seen that in the present design, there will be a static pull existing at the air gap 22 which will maintain a static compression of the springs 42. The magnitude of this static pull can be easily compensated by making the height of the spring assemblies 42 such that the static pull at the air gap 22 due to the permanent magnet polarization will compress the springs 42 such that the desired operating air gap dimension results in the assembly.

When A.C. current is supplied to the electromagnetic coils 28, relative vibrational oscillations are created between the internally suspended magnetic assembly and the external housing structure of the transducer. The relative efficiency of the transducer and the resultant band width is improved as the mass of the outer housing structure is reduced in proportion to the internal spring-mounted magnetic assembly. In order to minimize the weight of the external structure, it is preferable to employ a cylindrical housing which may be made relatively light to withstand high hydrostatic pressures as compared to a rectangular housing with flat side plates.

Those skilled in the art appreciate that it is desirable to provide the transducer with a baffle structure to prevent interference from out-of-phase radiation arising from the opposite ends of the transducer. To this end, a simple tubular baffle may be utilized in which a phase delay of one-half wavelength is imposed between the rear surface of the transducer and the medium to result in improved efficiency of radiation. The one-half wavelength baffle 62 illustrated in FIGURE 3 gives rise to this desired operation provided the one-half wavelength distance is many times larger than the length and diameter of the transducer and the distance C is negligible compared to $\lambda/2$ as shown. If the dimensions of the transducer are not negligible compared with the one-half wavelength dimension at its frequency of operation, then the path length distance between the open end of the baffle structure and the opposite transducer face $(\lambda/2+C)$ will be significantly greater than one-half wavelength and a lobe of radiation will appear along the axis of the cylindrical baffle, as illustrated in FIGURE 4.

In cases where it is desired to prevent the formation of the secondary radiation along the cylindrical axis, a folded tubular baffle arrangement 64, as illustrated in FIGURE 5, may be employed in which the projected axial distance of the cylindrical baffle is reduced by an amount such that the distance $L_2$ is made equal to one-half wavelength. The acoustic path $L_1$ through the telescoped tubular baffle 64 is also made equal to one-half wavelength at the frequency of operation. By this arrangement, energy cancellation will take place along the cylindrical axis of the assembly and a true cosine radiation characteristic will be established as shown in FIGURE 6.

Those skilled in the art can now appreciate that the new and improved transducer construction disclosed herein comprises a highly advantageous and efficient magnetic armature arrangement positioned within a sealed housing. It is contemplated that the housing may be filled with a suitable inert gaseous medium such as nitrogen, helium and the like. In addition, it is contemplated that the transducer may be utilized in combination with the various unique baffle structures as illustrated herein or in applicant's earlier co-pending application, S.N. 34,731, either singly or in groups or in aligned axial arrays, as desired, all within the teachings of the present invention.

While there have been shown and described several specific illustrative embodiments of the present invention, it will, of course, be understood that various modifications and alternative constructions may be made without departing from the true spirit and scope of the invention. Therefore, the appended claims are intended to cover all such modifications and alternative constructions as fall within their true spirit and scope.

What is claimed as the invention is:

1. The improvement of an underwater high acoustic power electroacoustic transducer comprising a sealed housing formed of a tubular body having an end plate at each end thereof, said sealed housing and end plates forming a rigid oscillatory hollow shell adapted to oscillate in reference to an inertial, internally suspended mass, said inertial, internally suspended mass comprising an inner plate having a pair of axially opposed faces, resilient means suspending said inner plate for axial movement between said end plates, a magnetic armature mounted on only one end plate, a magnetic assembly mounted only on the one face of said inner plate facing said one end plate, a coil means associated with said magnetic assembly, and sealed electrical terminal means in said housing connected to said coil means for enabling electrical connection to be established through said housing to said coil means.

2. The improvement of an electroacoustic transducer in accordance with claim 1 wherein said magnetic assembly comprises a plurality of permanent magnets for providing flux in the air gap formed by said magnetic armature and said magnetic assembly.

3. The improvement of an electromagnetic transducer in accordance with claim 1 further comprising second resilient suspension means secured to said inner plate and having negligible axial stiffness relative to the stiffness of the first resilient means, said second resilient suspension means providing a high degree of rigidity to transverse vibration of said inner plate to maintain the transverse stability of the internal vibratory assembly of the transducer.

4. The improvement of an electromagnetic transducer in accordance with claim 1 wherein the end plate to which the magnetic armature is not mounted consists of a generally hemispherical shell.

5. The improvement of an electroacoustic transducer and baffle assembly comprising a sealed housing formed of a tubular body having an end plate at each end thereof, said sealed housing and end plates forming a rigid oscillatory hollow shell adapted to oscillate in reference to an inertial, internally suspended mass, said inertial, internally suspended mass comprising an inner plate having a pair of axially opposed faces, resilient means suspending said inner plate for axial movement between said end plates, a magnetic armature mounted on only one end plate, a magnetic assembly mounted on only the one face of said inner plate facing said one end plate, coil means associated with said second magnetic assembly, sealed electrical terminal means in said housing connected to said coil means for enabling electrical connection to be established through said housing to said coil means, and a tubular baffle enclosing said housing, said baffle being closed at one end by said sealed housing and having an open end remote therefrom said baffle being approximately one-half wavelength long from one end plate of said housing to the open end of said baffle.

6. The improvement of an electroacoustic transducer and baffle assembly in accordance with claim 5 wherein said tubular baffle is formed by providing an arcuately displaced portion along its axis whereby the projected straight line distance between the open end of the tubular baffle and the face of the transducer housing nearest said open end is less than one-half wavelength at the frequency of operation of the transducer.

7. The improvement of an electroacoustic transducer comprising a sealed housing formed of a hollow body member having an end plate at each end thereof, said sealed housing and end plates forming a rigid oscillatory hollow shell adapted to oscillate in reference to an inertial, internally suspended mass, said inertial, internally suspended mass comprising a magnetic armature fastened to the inner surface of one of said end plates, a magnetic assembly comprising a plurality of magnetic elements each separated and bonded to a plurality of permanent magnets, a plurality of coil means associated with said magnetic assembly, said plurality of coil means being interconnected such that the passage of an A.C. electrical current through said plurality of coil means will cause additive instantaneous forces of attraction and repulsion between said magnetic armature and said magnetic assembly, resilient mens suspending said magnetic assembly for axial movement between said end plates and relative to said magnetic armature means, and sealed electrical terminal means in said housing connected to said coil means for enabling electrical connection to be established through said housing to said coil means.

8. The improvement of an electroacoustic transducer in accordance with claim 7 further comprising an inner plate within said hollow body member between said end plates, a second resilient suspension means attached to said inner plate, said second resilient suspension means having negligible axial stiffness in comparison to the stiffness of the first mentioned resilient suspending means, said second resilient suspension means providing high rigidity to transverse vibration of said inner plate to maintain the transverse stability of the vibrating inner structure portion of said transducer.

References Cited by the Examiner

UNITED STATES PATENTS

| | | | |
|---|---|---|---|
| 1,590,369 | 6/26 | Hahnemann et al. | |
| 1,604,693 | 10/26 | Hecht et al. | 340—8 |
| 1,733,718 | 10/29 | Blondel. | |
| 2,165,710 | 7/39 | Koch | 340—13 |
| 2,348,225 | 5/44 | Petty | 340—13 |
| 2,419,196 | 4/47 | Benioff | 340—12 |
| 2,435,587 | 2/48 | Harry | 340—13 |
| 2,832,842 | 4/58 | Knavert | 179—107 |

CHESTER L. JUSTUS, *Primary Examiner.*

KATHLEEN H. CLAFFY, FREDERICK M. STRADER,
*Examiners.*